(12) United States Patent
Jakob et al.

(10) Patent No.: US 6,336,779 B1
(45) Date of Patent: Jan. 8, 2002

(54) FASTENING SYSTEM

(75) Inventors: Andreas Jakob; Klaus Jahnke, both of Hemer; Peter Kirchhoff, Wickede; Mario Schneider, Landau, all of (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 09/659,076

(22) Filed: Sep. 11, 2000

(30) Foreign Application Priority Data

Sep. 15, 1999 (DE) .......................... 299 16 793

(51) Int. Cl.[7] ............................ F16B 37/02; F16B 39/30
(52) U.S. Cl. ..................... 411/175; 411/311; 411/329
(58) Field of Search ........................... 411/310, 311, 411/299, 174, 175, 326, 327, 328, 329

(56) References Cited

U.S. PATENT DOCUMENTS

| | | | | |
|---|---|---|---|---|
| 1,162,543 A | * | 1/1915 | Anderson | 411/329 |
| 1,227,310 A | * | 5/1917 | Quick | 411/327 |
| 4,334,814 A | * | 6/1982 | McKewan | 411/311 |
| 4,408,939 A | * | 10/1983 | Graff et al. | 411/174 X |
| 4,508,477 A | * | 4/1985 | Oehlke et al. | 411/174 |
| 5,256,018 A | * | 10/1993 | Rattman et al. | 411/175 |
| 5,273,383 A | * | 12/1993 | Hughes | 411/311 |
| 6,102,639 A | * | 8/2000 | Disastio | 411/299 |

FOREIGN PATENT DOCUMENTS

| DE | 9703 | * | 4/1956 | 411/329 |
|---|---|---|---|---|
| IT | 603455 | * | 4/1960 | 411/329 |

* cited by examiner

*Primary Examiner*—Neill Wilson
(74) *Attorney, Agent, or Firm*—Lowe Hauptman; Gilman & Berner, LLP

(57) ABSTRACT

A fastening system comprises a screw including a thread formed on a shank and configured to form a threaded bore in a plug made of a plastic material, and at least one notch formed in the shank between at least two adjacent turns of the thread. The system also comprises a clip including first and second clip bows connected at joined portions thereof. The first and second clip bows further have firs and second through apertures in their central portions which are aligned and sized to define a channel for allowing the shank of the screw to pass through. At least one of the first and second through apertures has an internal thread matching with the thread of the screw. The clip has at least one resilient lug adapted to engage with the at least one notch when the screw is fastened into the internal thread.

24 Claims, 3 Drawing Sheets

FASTENING SYSTEM

FIELD OF THE INVENTION

This invention relates to a fastening system. It serves for attaching a structural component to a carrier material.

BACKGROUND ART

It is been known already to insert a plug into a bore of a carrier material and to locate it therein by friction or securing it in place. In such a case, the plug has a bore into which a screw is rotated in order to fasten the structural component to the carrier material. The plug may then be located in the carrier material by forcing it in or latching it in by hinged feet or widening it by means of the screw. In known plastic plugs, threads are formed in the bore by rotating the screw in, e.g. by thread-molding or thread-cutting. For this purpose, the screw has a flank angle, which is comparatively acute as compared to screws for metal sheeting or metric-thread screws and typically is 30°. In addition, such screws have a pitch which is large as compared to screws for metal sheeting or metric-thread screws and may be 2.24 mm, for example.

The aforementioned fastening may be employed particularly for flat carrier materials which have a through-bore to receive a plug. Such a fastening is used especially in automobile manufacture, e.g. for attaching guide strips or panelings to the body.

SUMMARY OF THE INVENTION

In addition, fastenings for structural components to flat carrier materials are known already, which include a metallic screw and a metallic clip. The metallic screw typically has a relatively large flank angle of about 60° and a relatively small pitch of 1.6 mm, for example. The metallic clip has a through-bore which traverses either clip bow. One clip bow has formed in it a thread. The metallic clip is slid onto the edge of a carrier material so that its through-bore is aligned with a through-bore of the carrier material. The metallic screw is then rotated into the flush through-bores with its thread interacting with the thread of the metallic clip until the metallic screw is secured in place with the metallic clip and the carrier structural component which is received thereby. The structural component is secured on a through-bore between the screw head and the metallic clip. The threaded joint is self-locking.

Fastenings of this type are also employed specifically in automobile manufacture when structural components require to be attached in the marginal area of metal sheetings, e.g. panelings to wheel housings or safety bumpers to the body.

A drawback is that, apart from the plastic plug and the metallic clip, different screws need to be manufactured, kept in stock, and handled for these different fastenings which are employed in the same areas.

Based on this fact, it is an object of the invention to provide a less expensive fastening, system for fixing structural components to carrier materials.

The inventive fastening system includes
a screw which comprises a screw head and on a screw shank a thread which with respect to the pitch and the flank angle is matched to the formation of a thread in a bore of a plastic material, and at least one axially extending deepening on the thread root, and
a plastic material with a bore into which the screw may be threaded whilst forming a thread and/or clip with two clip bows and a clip back which connects these and which comprises a through-bore traversing the clip bows, with a thread for rotating in the screw and at least one resilient lug aligned radially to the axis of the through-bore for latching into the at least one deepening of the screw when this is rotated into the through-bore of the clip.

The fastening system comprises a "plastic-tailored" screw. This means that the screw is configured as to its pitch and flank angle in such a way that it is capable of forming an appropriate thread in a bore of a plastic material. At this point, the pitch must not be dimensioned so small and the flank angle must not be dimensioned so large that the formation of a thread in the bore can no longer be achieved at an acceptable expenditure and the load-carrying ability of the threaded joint is too low. On the other hand, the pitch must not be chosen so large to prevent the engaging threads from being self-locking and the flank angle chosen must not be chosen so small that the load-carrying ability of the thread flank becomes insufficient.

Preferably, the thread of the screw has a flank angle of about 20 to 40°, especially about 30°. Preferably, the thread of the screw further has a pitch of from 1.5 to 3.5 mm, specifically 2.2 mm (cf. the embodiment), which particularly depends on the measure of the outside diameter.

However, the ranges given may be exceeded or remain below the mark because shaping a plastic-tailored thread may be dependent on influencing parameters such as the surface finish of the screw and the substance of the plastic material, the dimensions of the screw and the bore, and the speed of the screw-driver for rotating in the screw, which may vary very much from one case to another.

The design of the screw ensures that structural components can be fixed to plastic materials. This may concern, in particular, a plug made of plastic or carrier materials in plastic or plastic portions of carrier materials thereof. In particular, it may concern a plastic dome of a carrier material which may be of a different material. The carrier materials may be both thick and flat.

Furthermore, it is possible to fix a structural component to a flat carrier material or a flat portion of a carrier material by means of a clip. It has a thread which is matched to the thread of the plastic-tailored screw, i.e. it has a pitch larger than that of a conventional metallic clip. This screwed joint has less self-locking properties. However, it is ensured that the clip be locked by the fact that the clip latches its at least one resilient lug into the at least one axially extending deepening of the screw when this one has been rotated into the clip. It is understood here that the at least one lug may be latched several times into the at least one deepening while the screw is rotated in, and may be unlatched again therefrom. Preferably, there are several deepenings to make arresting possible in various angular positions of the screw. Also, several lugs may be uniformly spaced around the through-bore of the clip in order to uniformly load the screw at the circumference.

The deepening extends in the axial direction of the screw, which deepening may also run in a helical shape. What is essential is that it has a pitch which at least differs from that of the screw thread. Preferably, however, the at least one deepening extends parallel to the screw shank. Since the screw thread has a relatively large pitch it may have a thread root which may be relatively wide and on which at least one deepening may be accommodated.

The at least one deepening may be of a symmetrical (e.g. a U or V-shaped) or an asymmetrical (e.g. a saw-tooth shaped) cross-section. The latter offers a possibility, while the screw is rotated into the thread of the clip, to make it easier for the lug to exit from the deepening by appropriately inclining one flank thereof and, if there is a load in the opposed direction, to make it more difficult for the lug to exit from the deepening by causing the lug to abut against a correspondingly steep flank.

The clip preferably is designed as a spring clip where a spring bow may have an angled tab to make it easier to slide the spring clip onto a flat material. In addition, the clip may have one or more barbs at the inside to secure the clip to a structural component in a pre-assembled position.

The at least one lug may have an end portion tapering towards the free end, which makes it more convenient to rotate in the screw and to precisely lock it in a determined position. Preferably, the at least one lug is bent out of the flat material of the clip. Although the material of the clip may be a metal, particularly a metal sheeting, a plastic may be considered as well.

BRIEF DESCRIPTION OF THE DRAWINGS

The invention will now be explained with reference to the accompanying drawings of an embodiment. In the drawings.

DETAILED DESCRIPTION OF THE INVENTION

Figure 1A:
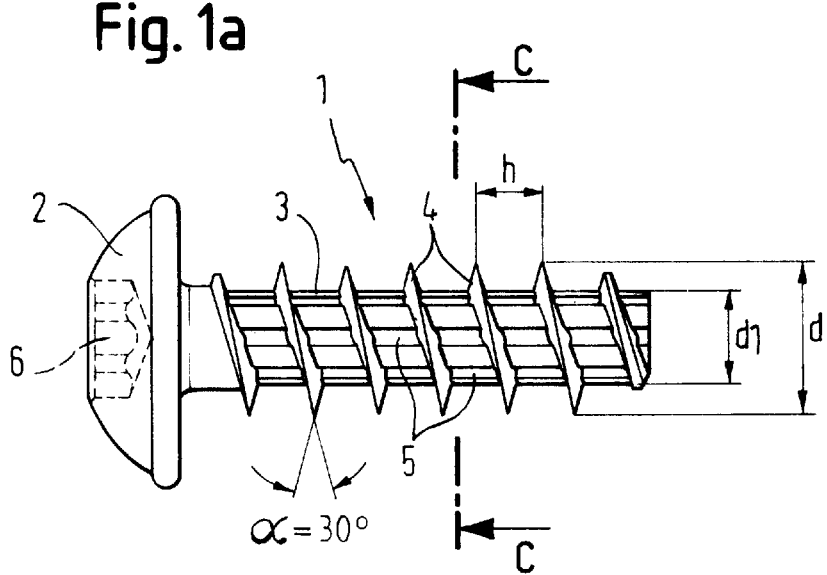
FIGS. 1a to d show a plastic-tailored screw in a lateral view (FIG. 1a), a top view (FIG. 1b), a section taken along lines c—c of FIG. 1a (FIG. 1c), and an enlarged view of the detail d of FIG. 1c (FIG. 1d)
Figure 1B:
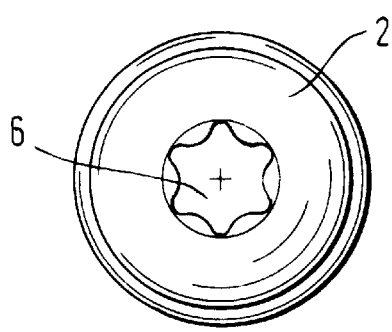
Figure 1C:
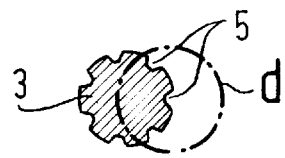
Figure 1D:
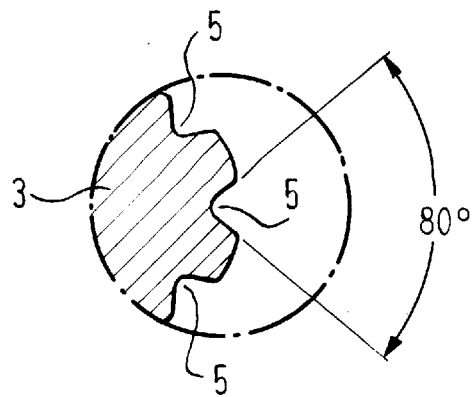
Figure 2A:
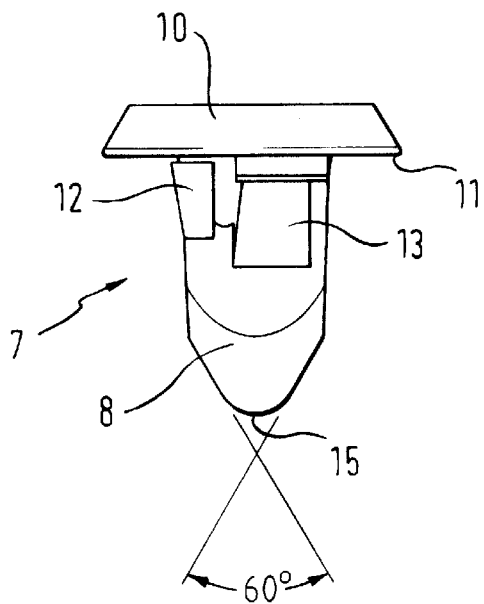
FIGS. 2a to d show a plug in plastic material in a lateral view (FIG. 2a), a top view (FIG. 2b), a section taken along lines c—c of FIG. 2b (FIG. 2c), and a section taken along lines d—d of FIG. 2c(FIG. 2d)
Figure 2C:
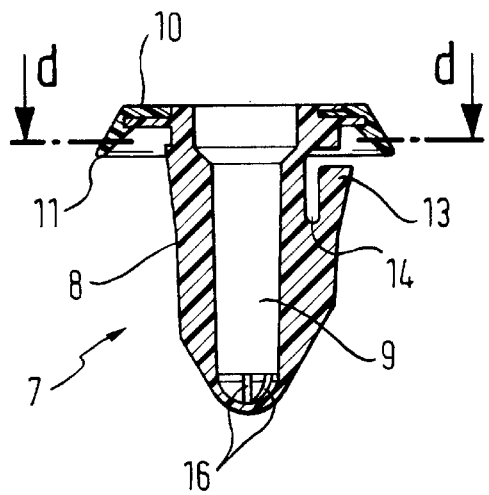
Figure 2B:
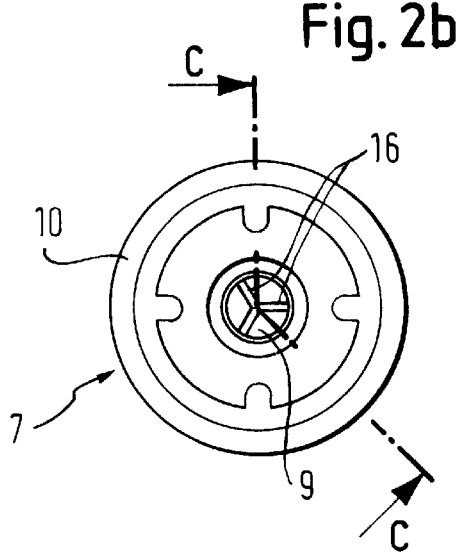
Figure 2D:
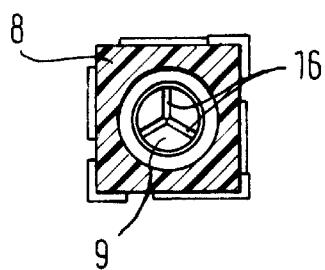

Referring to FIG. 1, a screw 1 has a screw head 2 formed as a mushroom-head with a flange at its underside, and a screw shank 3. The screw shank 3 carries a thread (4) which is designed as a V-cut thread. The V-cut thread 4 is gradually flattened towards the obtuse end of the screw shank 3.

The thread 4 has a pitch h of about 2.2 mm and a flank angle $\alpha$ of 30°. In the embodiment, the outer diameter d of the thread 4 is about 5,18 mm and its minor diameter $d_1$, is about 3.1 mm.

Disposed on the screw shank 3 at the cylindrical thread root are seven groove-shaped deepenings 5 uniformly distributed over its circumference which extend in the axial direction of the screw shank 3. The deepenings 5 are interrupted by the flanks of the thread 4. The deepenings 5 are of a substantially V-shaped cross-section having an angle of aperture of 80°, for example. The deepenings are radiused at their root and their transition zone to the outer circumference of the screw shank 3.

The screw head 2 has a tool catch accessible from the top which is designed as an inside hexagon circular socket or inside star recess (Torx®—applicant's registered mark), but can also be a hexagon socket or intersecting slots.

Within the scope of the invention, the screw 1 may be subjected to various hardening processes, i.e. it may be heat-treated or case-hardened. Other head shapes, thread profiles, and thread crests are incorporated as well. In particular, symmetrical thread profiles are taken into consideration.

Referring to FIG. 2, a plug 7 in plastic material is shown. It has a plug body 8 which is adapted to be inserted into the through-bore of a flat carrier material and has a bore 9 oriented in the direction of insertion for fastening the screw 1. At top, the plug body 8 carries a resilient sealing collar 10 which extends outwardly around the plug body 8 radially to the direction of insertion and has an annular sealing surface 11 which is oriented in the direction of insertion. The sealing collar 10 is made of a material softer than that of the plug body 8. In the embodiment, the sealing collar 10 is fixed to the plug body 8 by chemical adhesion. The plug body 8 has barbs 12, 13 disposed at its outer circumference which let pass in the direction of insertion and block in the direction opposed to insertion. At this point, the barb 12 is designed as a detent foot which will be compressed during the forcing-in operation. The barb 13 is a hinged foot which can back out inwardly into a groove 14.

The plug body 8 tapers towards the lower end. In the embodiment, the tapering is conical at an angle of 60°. This facilitates insertion into the through-bore of the carrier material.

At bottom, the plug body 8 has a tip 15 which includes strength-reducing lines 16. This makes it possible, by breaking the tip open, to rotate in a screw which cannot be fully received by the bore 9.

The plug 7 is inserted in a through-bore of a flat material until one of the barbs 12, 13 snaps below the underside of the flat material. The sealing collar 10 will then sealingly abut against the upper surface of the flat material which, for example, may be the metal sheeting of an automobile body. Subsequently, the screw 1 may be rotated into the bore 9, thus forming a thread in the bore 9. The large pitch and the relatively acute flank angle of the thread 4 of the screw 1 make it more convenient to rotate in a thread of high load-carrying ability. At this point, a structural component to be fastened is guided on the screw on a bore so that the structural component ultimately comes to be sandwiched between the screw head 2 and the plug 7 or the upper surface of the flat material. This threaded joint is self-locking.

Figure 3A:
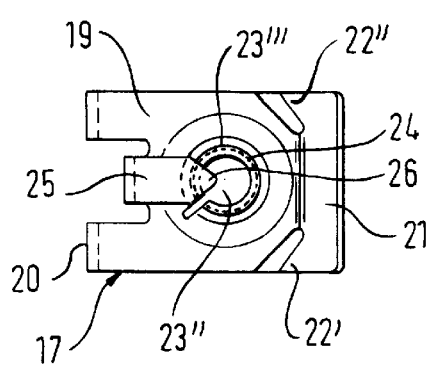
FIGS. 3a to c show a clip in a top view (FIG. 3a), a longitudinal section (FIG. 3b), and a perspective view oblique from top with an inserted screw of FIG. 1 (FIG. 3c)
Figure 3C:
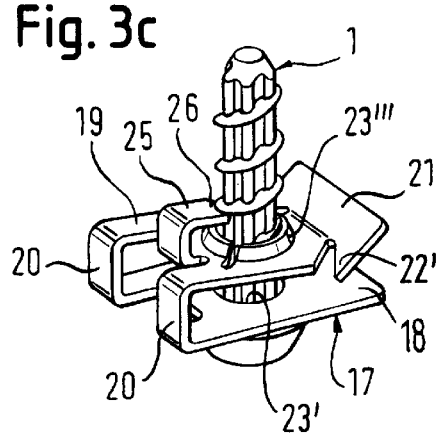
Figure 3B:
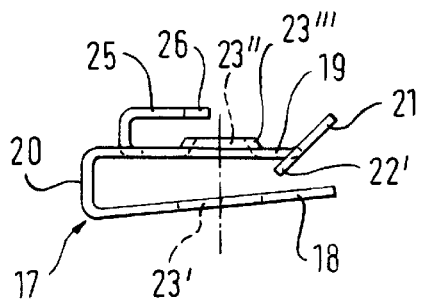

FIG. 3 shows a clip 17 which is made of a metal sheeting. It has two clip bows 18, 19 which are laterally interconnected via a clip back 20. The clip bow 19 is inclined at an acute angle to the clip bow 18 and defines a spring bow. It has an angled tab 21 at its end which makes it easier to slide it onto the edge of a flat material. The tab 21 is joined to the clip bow 19 only in the central region so that it has pointed portions at either side which extend below the clip bow 19 and define barbs 22', 22". These barbs 22', 22" help in securing the clip 17 in a pre-assembled position by digging their way into the upper surface of the flat carrier material which, for example, may be of plastic or metal.

The clip bows 18, 19 are traversed by a through-bore 23', 23" approximately in their center. The portion 23" of the through-bore has a upwardly facing or bordered-up edge 23'". Formed in the inside of this edge 23'" is a thread 24 which is dimensioned so as to be able to interact with the thread 4 of the screw 1. The thread 24 extends only approximately over a complete thread turn.

Clips which are meant for a larger range of clipping widths may also have a bow portion separated from the clip bow 19 at three sides, which is bent out of the clip bow 19 so as to extend approximately parallel to the clip bow 18 and which houses the portion 23' of the through-bore. This allows to improve the alignment of the portions 23', 23" on each other.

Finally, the clip 17 has a lug 25 which also is bent out of the sheeting. To this end, the lug 25 is separated (e.g. punched out) from the marginal areas of the clip bows 18, 19 and the clip back 20 and is merely joined to the clip bow 19. It is bent back over the clip bow 19 so as to extend its end portion 26 tapering towards its free end beyond the marginal area of the through-bore 23', 23". At this point, the end portion 26 is aligned approximately radially to the through-bore 23', 23".

For purposes of fastening, a clip 17 is slid onto the marginal area of a metal sheeting or plastic part and is flushly placed, with its through-bore 23', 23", above a through-bore thereof. The barbs 22', 22" hold the clip 17 in place in this pre-assembled position.

Figure 4:
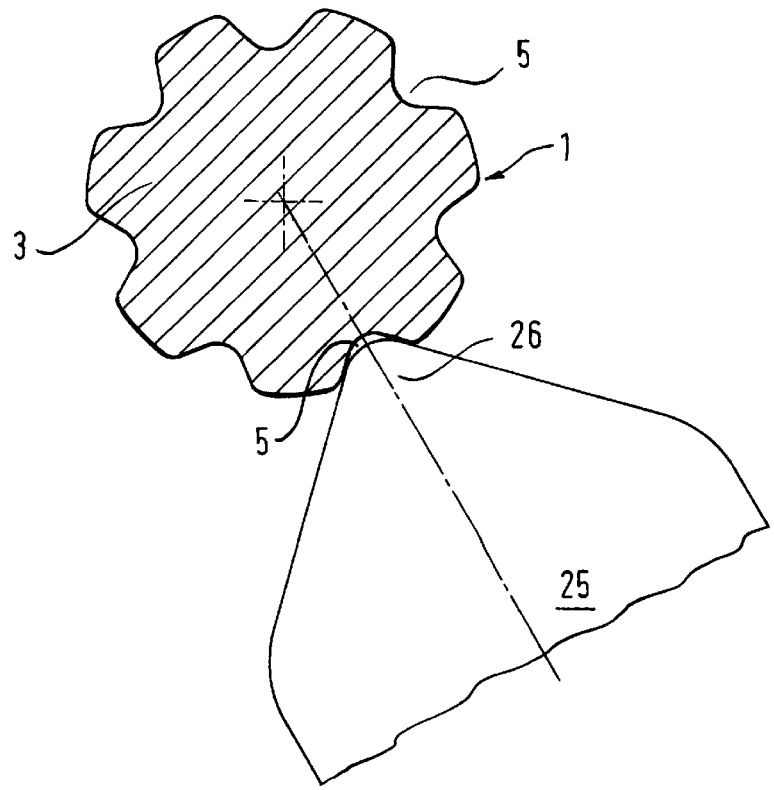
FIG. 4 shows the lug of the clip engaging a deepening of the screw in a strongly enlarged partial section.

Subsequently, a screw 1 is rotated into the through-bore 23', 23", namely starting from the side of the clip bow 18. The screw thread 4 grips behind the thread 24 of the clip 17 here. While the screw 1 is being rotated in the lug 25 will snap into each continuous deepening 5 of the screw shank 3 (cf. FIG. 4). Finally, a structural component slipped onto the screw shank 3 is secured in place between the screw head 2 and the clip bow 18 or the carrier material. At the same time, the clip bow 19 is secured in place to the inside of the carrier material. After it is sufficiently secured in place the screw 1 is brought into a rotational position in which the lug 25 latches into a deepening 5. After this, the fastening is self-locking although the acute angle and the large thread pitch h, while interacting with the thread 24 of the clip alone would not cause a sufficient self-locking action.

What can be reached by arranging several lugs 25 at angular spacings which deviate from those of the deepenings 5 is that a lug 25 engages a deepening 5 virtually in any angular position of the screw. This is possible, for example, if the lugs are arranged in differing angular spacings over the circumference and/or if there are differing numbers of lugs and deepenings.

Thus, the fastening system which only has a screw 1 makes it possible to provide self-locking fastenings, especially on flat materials, by resorting to a plug 10 or a clamp 17 if this is necessary.

What is claimed is:

1. A fastening assembly, comprising:
   a screw including
      a shank;
      a head formed at one end of the shank;
      a thread formed on the shank and having a pitch and a flank angle configured to form a threaded bore in a plastic material;
      and at least one notch formed in the shank between at least two adjacent turns of the thread; and
   a clip including
      first and second clip bows each having lead-in, central and joined portions, the first and second clip bows further having first and second through apertures in the central portions thereof, respectively, the first and second through apertures being substantially aligned and sized to define a channel for allowing the shank of the screw to pass through, at least one of the first and second through apertures having an internal thread matching with the thread of the screw;
      a clip back connecting the joined portions of the first and second clip bows; and
      and at least one resilient lug adapted to engage with the at least one notch when the screw is fastened into the internal thread.

2. The fastening assembly of claim 1, wherein the flank angle of the screw is of from about 20° to about 40°.

3. The fastening assembly of claim 1, wherein the pitch of the screw is of from about 1.5 mm to about 3.5 mm.

4. The fastening assembly of claim 1, wherein the at least one notch comprises a plurality of notches distributed uniformly circumferentially of the shank.

5. The fastening assembly of claim 1, wherein the at least one notch extends axially of the shank.

6. The fastening assembly of claim 1, wherein the at least one notch is configured symmetrically with respect to a radial direction of the shank.

7. The fastening assembly of claim 1, wherein the at least one notch is configured asymmetrically with respect to a radial direction of the shank so that the resilient lug, engaged with the at least one notch, causes more resistance to movements of the screw in a loosening rotational direction than in a fastening rotational direction opposite to the loosening rotational direction.

8. The fastening assembly of claim 1, wherein the second clip bow of the clip is a spring bow which, in an unloaded state, is inclined to the first clip bow and, in a loaded state when a free edge of a flange is inserted between the first and second clip bows, is pivoted about the clip back away from the first bow.

9. The fastening assembly of claim 8, wherein the lead-in portion of the second clip bow comprises a suspension lug slanted with respect to the central portion of the second clip bow, the suspension lug having a first portion extending into a space between the first and second clip bows and toward the clip back, and a second portion heading away from the clip back, thereby facilitating the insertion of the free edge of the flange in between the first and second clip bows.

10. The fastening assembly of claim 9, wherein the first portion of the suspension lug is provided with at least one barb for preventing separation of the clip from the flange.

11. The fastening assembly of claim 1, wherein the at least one resilient lugs comprises a plurality of lugs arranged symmetrically circumferentially of the channel.

12. The fastening assembly of claim 1, wherein the at least one resilient lug has a free end tapered toward the channel for engaging with the at least one notch of the screw.

13. The fastening assembly of claim 1, wherein the at least one resilient lug is a part of the central portion adjacent to the joined portion of the second clip bow which is bent into a substantially U-shape.

14. The fastening assembly of claim 1, wherein the clip (17) is made integrally of a metal sheet.

15. The fastening assembly of claim 1, wherein the at least one resilient lug extends into the channel in a radial direction thereof.

16. The fastening assembly of claim 1, wherein the thread extends continuously in a helical path along the shank without being interrupted by the at least one notch.

17. The fastening assembly of claim 1, wherein the at least one notch extends axially of the shank from one of the at least two adjacent turns of the thread to the other.

18. The fastening assembly of claim 1, wherein the internal thread comprises approximately one complete turn.

19. The fastening assembly of claim 1, wherein the central portion of the second clip bow is substantially flat with two opposite parallel faces, the second through aperture extending from one of the two opposite parallel faces toward and beyond the other.

20. The fastening assembly of claim 1, wherein the at least one resilient lug is formed outside of the first and second through apertures.

21. The fastening assembly of claim 15, wherein the at least one notch extends inwardly from an outer circumferential surface of the shank and has a leading wall and a trailing wall with respect to a fastening rotational direction of the screw, the outer circumferential surface, the leading and trailing walls are connected by radiused sections.

22. The fastening assembly of claim 21, wherein the leading and trailing walls are disposed symmetrically with respect to the radial direction.

23. The fastening assembly of claim 21, wherein the trailing wall is steeper than the leading wall thereby locking the screw from rotating in a loosening rotational direction opposite to the fastening rotational direction.

24. The fastening assembly of claim 19, wherein second through aperture extending away from the first clip bow.

* * * * *